United States Patent [19]
Kouda

[11] Patent Number: 6,089,539
[45] Date of Patent: Jul. 18, 2000

[54] VALVED PIPE COUPLING FOR FLUID LINES

[75] Inventor: Toru Kouda, Tokyo, Japan

[73] Assignee: Nitto Kohki Co., Ltd., Tokyo, Japan

[21] Appl. No.: 09/153,124

[22] Filed: Sep. 15, 1998

[30] Foreign Application Priority Data

Oct. 6, 1997 [JP] Japan ................................ 9-289059

[51] Int. Cl.[7] ............................................. F16L 29/00
[52] U.S. Cl. .................................. 251/149.2; 251/149.9
[58] Field of Search .......................... 251/149.2, 149.6, 251/149.9, 315.16

[56] References Cited

U.S. PATENT DOCUMENTS

| Re. 27,364 | 5/1972 | German | 251/149.6 |
|---|---|---|---|
| 1,331,025 | 2/1920 | Riggin | 251/315.16 |
| 3,423,063 | 1/1969 | German | 251/149.6 |
| 3,618,892 | 11/1971 | Scuito, Jr. | 251/149.2 |
| 4,627,598 | 12/1986 | Fremy | 251/149.6 |
| 5,090,448 | 2/1992 | Truchet | 251/149.2 |
| 5,290,009 | 3/1994 | Heilmann | 251/149.6 |
| 5,494,073 | 2/1996 | Saito | 251/149.6 |
| 5,540,250 | 7/1996 | Mullins | 251/149.6 |
| 5,884,897 | 3/1999 | Arosio | 251/149.6 |
| 5,927,683 | 7/1999 | Weh et al. | 251/149.6 |

FOREIGN PATENT DOCUMENTS 51-47899  of 0000  Japan.

*Primary Examiner*—Kevin Shaver
*Assistant Examiner*—Eric Keasel
*Attorney, Agent, or Firm*—Westman, Champlin & Kelly, P.A.

[57] ABSTRACT

A pipe coupling improved in operational and functional characteristics is provided. As an outer sleeve 1 is moved backward, an inner sleeve 9 comes into engagement at its locking balls 62 with the outer sleeve 1 and retracts together with the outer sleeve 1. A slide holder 8 remains urged backward by the inner pressure until the inner pressure drops down to a specific level, thus holding the locking balls 61 in a socket 4 at their radial outward position. As the locking balls 61 interrupt the backward movement of the inner sleeve 9, the outer sleeve 1 is prevented from further moving backward. While the inner sleeve 9 is paused, it interrupts the radial movement of locking balls 63. This permits the locking balls 63 to partially project into the inner side of the socket 4 and come into engagement with an outer groove 200b provided in the outer surface of a plug 200 which is thus locked and not removed out.

5 Claims, 7 Drawing Sheets

(BACK)  (FRONT)

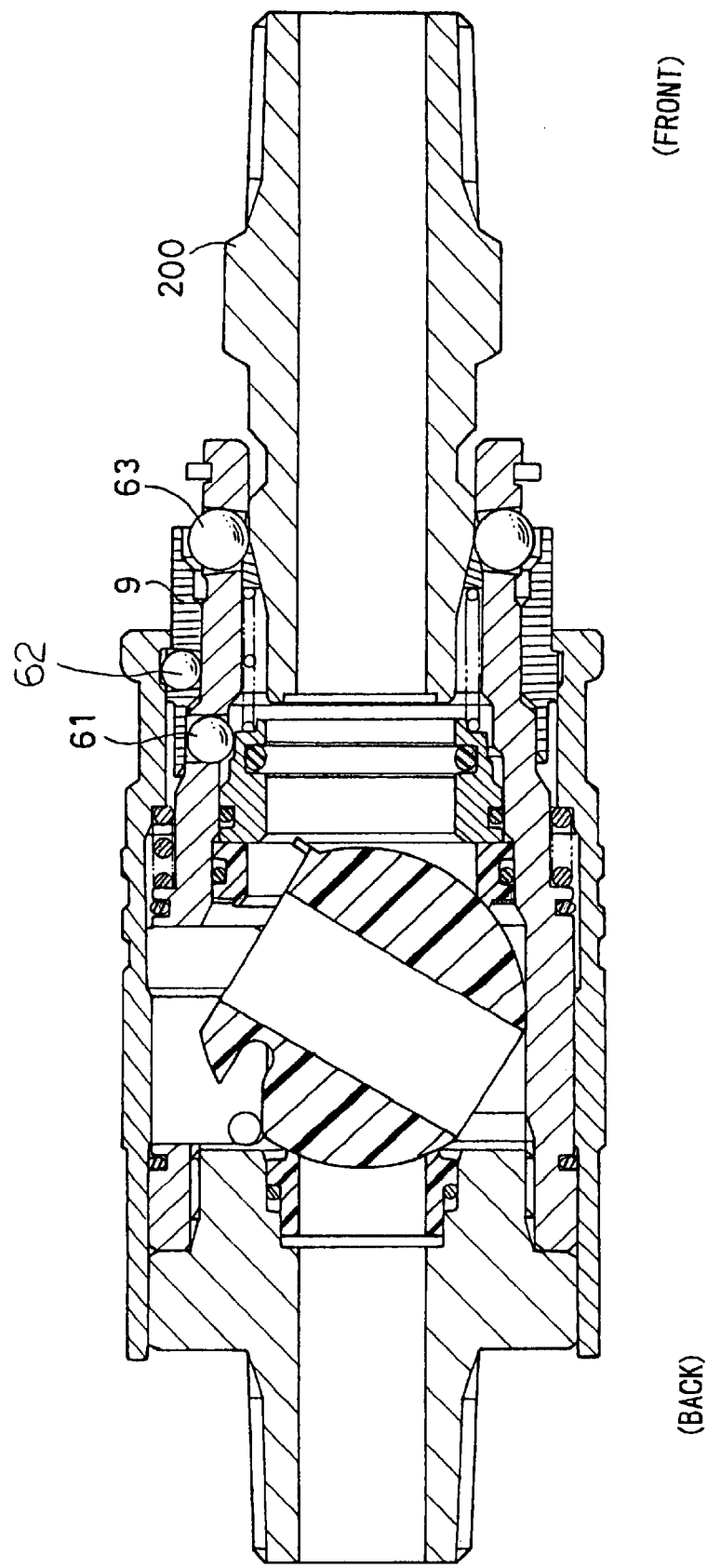

VALVED PIPE COUPLING FOR FLUID LINES

BACKGROUND OF THE INVENTION

1. Field of the Invention

The present invention relates to a pipe coupling on which a plug can easily be connected or disconnected and particularly, a pipe coupling equipped with a ball valve as the valve member.

2. Description of the Related Art

Pipe couplings equipped with ball valves as the valve members are disclosed in Japanese Patent Publication Sho 51-47899 and U.S. Pat. No. 3,423,063. Such a pipe coupling has a fluid passage provided in the center of a ball valve thereof which is pivotably mounted in a valve chamber. The pipe coupling has at one end a pipe joint portion thereof to which a pipe is joined for supply of pressurized fluid such as gas or liquid. Also, a plug extending to a destination to which the fluid is supplied is detachably joined to the other end of the pipe coupling. While the pipe coupling is disconnected from the plug, its ball valve remains rotated to the closed position to shut down the fluid passage on the pipe side with a non-open spherical side (surface) of the ball valve.

When the pipe coupling is connected with the plug and its outer sleeve of a tubular shape is axially slid towards the plug, the sliding movement gradually drives the ball valve to pivotally rotate to the opened position. As the result, the pipe joint portion of the coupling is communicated via the fluid passage in the ball valve to the fluid passage of the plug.

For disconnecting the plug from the pipe coupling according to Japanese Patent Publication SHO 51-47899, the outer sleeve is moved towards the pipe joint portion in the reverse direction to the sliding movement for the connection. The reverse sliding movement causes the ball valve to gradually rotate back to the closed position. As the outer sleeve has been moved to a predetermined position, the ball valve completely shuts down the fluid communication between the pipe joint portion and the fluid passage in the plug. At the same time a mechanical engagement between the pipe coupling and the plug released.

For disconnecting the plug from the pipe coupling, an outer sleeve is first slid backward according to U.S. Pat. No. 3,423,063. The ball valve is set in an opened position, an inlet end is sealed and at the same time an outlet end is purged. Next, an inner sleeve is slid backwardly. A locking ball which engaged the plug with the outlet end is set free and the plug can thereby be released from the outlet end.

The conventional pipe coupling, however, has the following disadvantages.

(1) When the communication between the pipe joint portion of the coupling and the fluid passage in the plug has been shut down by the ball valve, the passage in the plug stays under pressure for a while. It is preferable, therefore, when the plug is to be mechanically disengaged from the pipe coupling, to purge a fluid in the plug to lower the inner pressure after the fluid passage is shut down.

In Japanese Patent Publication SHO 51-47899, the shut down of the fluid passage and the disconnection of the plug are executed in a succession by a single operation. It is thus difficult to carry out only the closing movement of the ball valve without the plug disconnection from the pipe coupling. When the operation for the disconnection is carried out, the plug is mechanically disconnected from the pipe coupling regardless of the magnitude of its inner pressure. If the outer sleeve is accidentally handled for removal before the inner pressure drops down to a given level, it is undesirably disconnected.

In U.S. Pat. No. 3,423,063, after the outer sleeve is slid for release and the pressurized fluid in the plug is purged enough, the inner sleeve should be slid for release. However, if the outer sleeve and the inner sleeve are operated quickly or the purge quantity is small relative to internal pressure, the plug can be disadvantageously released from the outlet before the internal pressure is decreased.

(2) The sealings between the opposite openings of the fluid passage in the ball valve and the fluid passages in the pipe and the plug are respectively realized with the sealing members such as packings. In the communicating mode, it is essential that the sealing members are highly stressed against regions about the openings of the fluid passage for optimum sealing effects. On the contrary, for rotating back the ball valve, it is necessary to allow the free movement of the ball valve without the stress. Such two opposite conditions can hardly be satisfied at one time.

(3) The ball valve is pivotally mounted but not supported by a pivot in the valve chamber. When the ball valve is rotated, therefore, it may divert from its essential rotating direction or perform a parallel movement, hence failing to move to the correct positions in the closing and opening operations.

(4) For communication of its fluid passage in the coupling, the ball valve is pivotally driven by the elastic force of a spring. In operation, the ball valve is actually driven by the elastic force during a portion of the period from the closed position to the opened position and then rotated by an internal force to the opened position. For avoiding any imperfect rotating movement to the opening position, the elastic force applied to the ball valve is relatively large. As the ball valve remains high in rotating speed even just before reaching the opened position, it will hardly be stopped at the opened position without error.

(5) When the sliding movement of the outer sleeve towards the plug for opening the valve is not adequate and the outer sleeve fails to reach the desired position, the ball valve is hardly rotated to the opened position.

SUMMARY OF THE INVENTION

It is an object of the present invention to provide a pipe coupling improved in operational and functional characteristics.

A pipe coupling according to the present invention has a pipe joint opening at one end and a plug connect opening at the other end, wherein upon a plug being inserted, the pipe joint opening and the plug connect opening are connected to each other via a fluid passage through a ball valve. In particular, no action for disconnecting the plug is allowed until the inner pressure in the plug drops down to a specific level as a considerable amount of the pressurized fluid has been purged out from the plug after the ball valve is rotated from the opened position to the closed position.

Accordingly, the disconnection of the plug before the fluid under pressure is fairly purged out from the plug is not permitted thus preventing any accidental removal of the plug prior to the decrease of the inner pressure in the plug to a specific level.

BRIEF DESCRIPTION OF THE DRAWINGS

FIG. 8 is a cross sectional view of a fourth step of the disconnection of the plug from the pipe coupling.

DETAILED DESCRIPTION OF THE PREFERRED EMBODIMENT

Figures 1, 4:
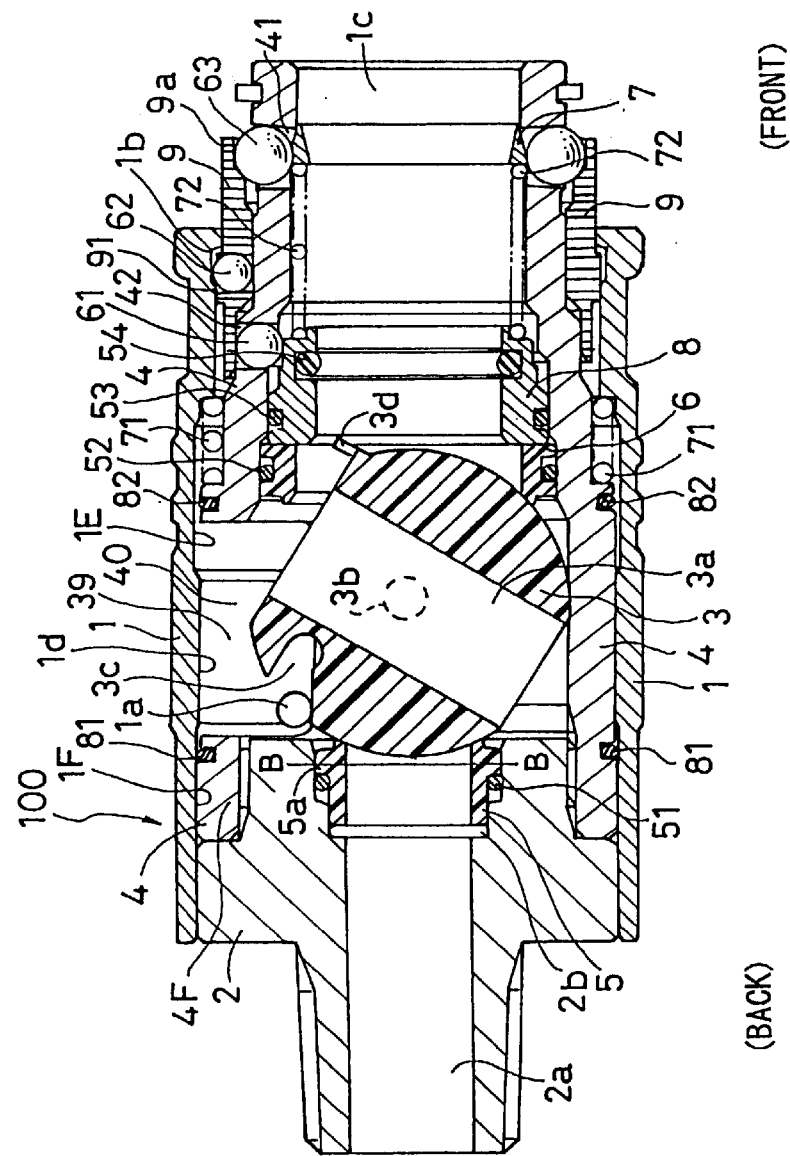
FIG. 1 is a cross sectional view showing the pipe coupling with a ball valve being in closed position.
FIG. 4 is a cross sectional view taken along the line A—A of FIG. 3.

The present invention will be described in more detail referring to the accompanying drawings. Referring to FIG. 1, the plug connect opening 1c for receiving a plug (shown at 200 in other figures) is provided in a tubular socket body 4 (referred to as simply a "socket" hereinafter) which is threaded at an inlet end thereof onto a pipe joint member 2 to form a valve chamber 39. The chamber 39 communicates at the other end to the plug connect or outlet opening 1c. An outer sleeve 1 is fitted around the socket 4 for sliding movement.

The pipe joint member 2 has a fluid passage 2a provided therein along its center axis. At the socket side end of the member 2, an opening 2b is provided coaxially with the fluid passage 2a and of which inner diameter is gradually enlarged towards the outlet end. A pipe side slide packing 5 of a tubular shape is mounted in the opening 2b as arranged slidable in the axial direction. The pipe side slide packing 5 has an annular outer projection 5a provided on the outer side thereof. An O-ring 51 is mounted between the annular projection 5a and the step of the opening 2b.

Figure 3:
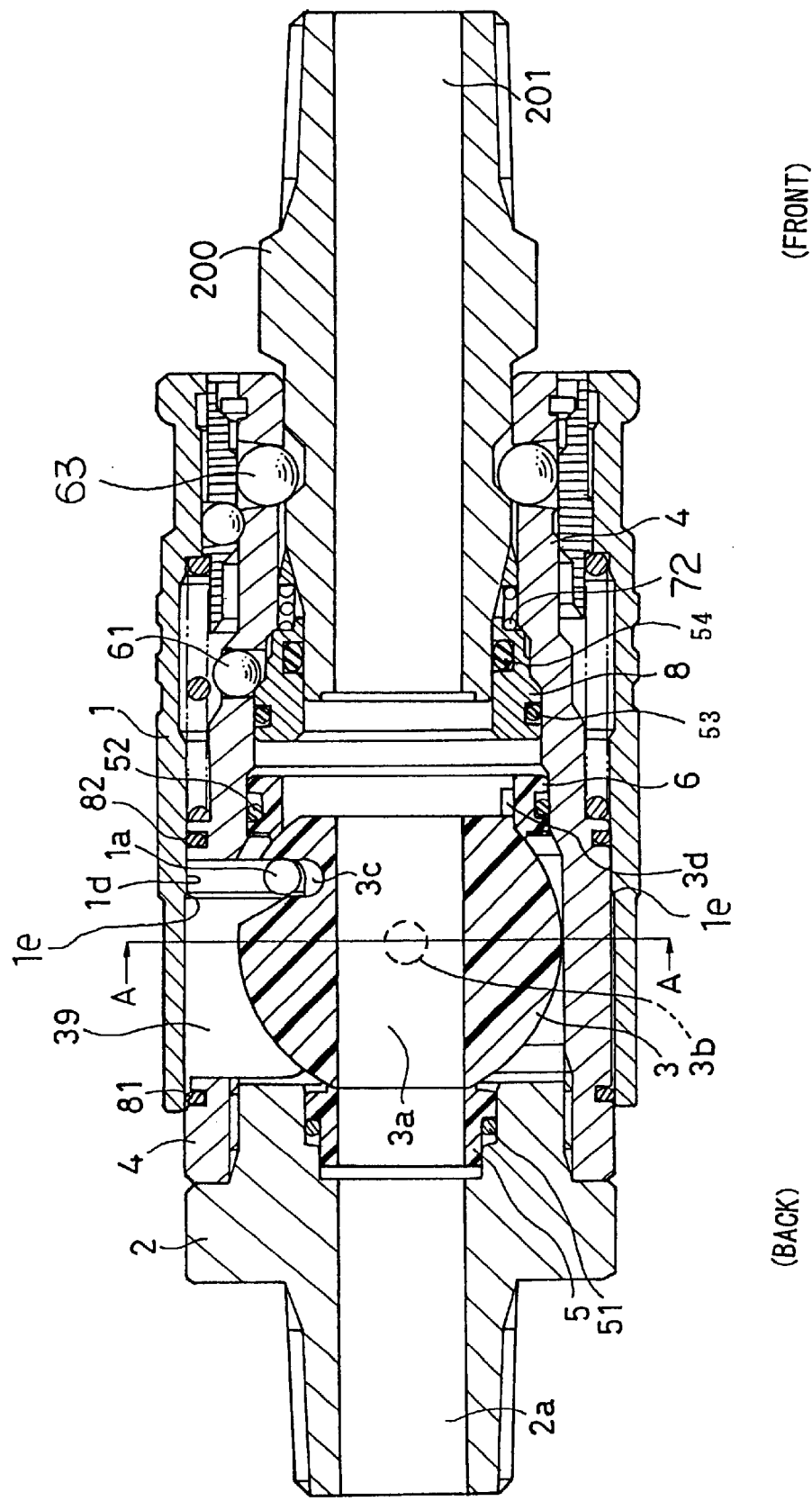
FIG. 3 is a cross sectional view showing a pipe coupling with the plug having been inserted and the ball valve being in opened position.
Figure 5:
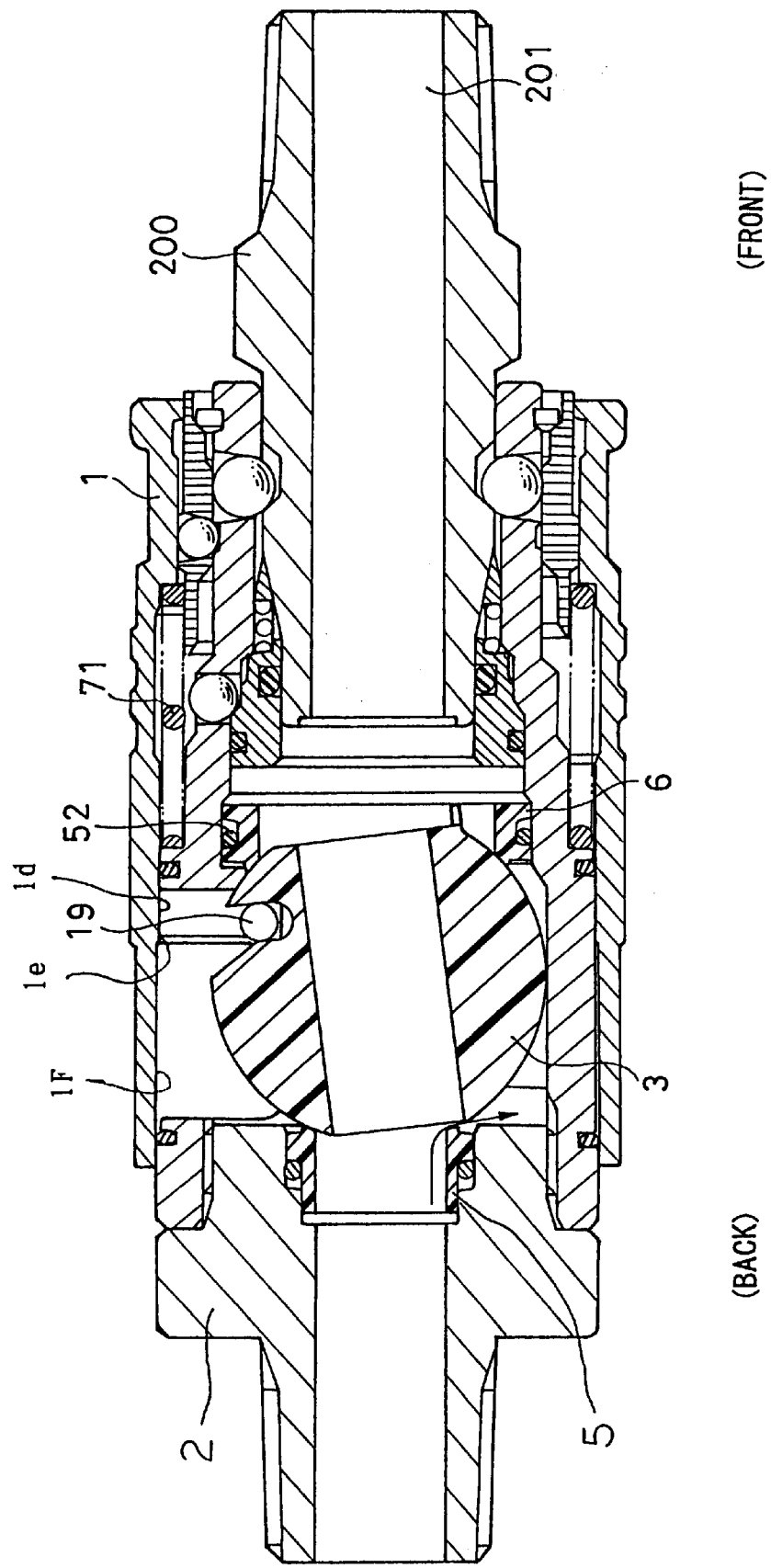
FIG. 5 is a cross sectional view of a first step of the disconnection of the plug from the pipe coupling.

The valve chamber 39 in the socket 4 has a window 40 thereof for allowing a parallel pin 1a, described later, to slide in the axial direction. A pair of seal rings 81 and 82 sandwiching the valve chamber 39 are mounted between the inside surface of the outer sleeve 1 and the outer surface of the socket 4. The seal ring 81 slidably contacts to a large-diameter portion 1F (on the side of the pipe joint member) of the inner surface of the outer sleeve 1 to or fluidly seal the valve chamber 39. The seal ring 82 slidably contacts to a small-diameter portion 1d of the inner surface at an intermediate section side of the outer sleeve 1 to air-tightly seal the valve chamber 39 while the outer sleeve 1 moves towards the plug connect opening 1c as shown in FIGS. 3 and 5.

The socket 4 is gradually reduced in the outer diameter from the valve chamber 39 to the plug connection opening or outlet 1c. A plurality of tapered bores 41 are provided in a wall of the small-diameter region near the outer or outlet end of the socket 4 so as to extend radially through the wall. The diameter of each bores 41 is slightly greater at the outer surface than at the inner surface of the socket wall. A locking ball 63 of which diameter is greater than the thickness of the wall of the socket 4 is freely fitted into each tapered bores 41 so that it can move inwardly and outwardly in the radial direction of the socket 4. Similarly, a plurality of tapered bores 42 are provided in a medium-diameter region next to the small-diameter region, which is slightly greater than the small-diameter region in the outer diameter. The diameter of each bore 42 is greater at the inner surface than at the outer side surface of the socket wall. A locking ball 61 is freely fitted into each the tapered bore 42 so that it can move in the radial direction of the socket 4.

An inner sleeve 9 which is axially movable is fitted over the small-diameter and medium-diameter regions of the socket 4 to limit, from the outer side, the radial movement of the locking balls 61 and 62. The inner sleeve 9 has a plurality of tapered bores 91 provided in a substantially center, thick-wall region thereof and extending radially through the thick-wall region of which diameters are greater at the outer side than at the inner side. A locking ball 62 is freely fitted into each the tapered bore 91 so that it can move in the radial direction of the inner sleeve 9.

There are also mounted in the socket 4 a plug side slide packing 6 accompanied with an O-ring 52 for providing air-tight seal of the plug connect opening 1c, a slide holder 8 accompanied with an O-ring 53 for providing air-tight seal of the plug connect opening 1c, and a slide collar 7 pressed by the yielding force of a collar spring 72 against the slide holder 8 for radially outwards urging the locking balls 63 in their tapered bores 41 when the plug is not inserted.

As shown in FIG. 4, a ball valve 3 has two pivot portions 3b thereof supported by a pair of valve supporters provided in a wall of the socket 4 respectively so that it can freely rotate about the pivot portions defining a pivot axis in the valve chamber 39 of the socket 4. The ball valve 3 has a fluid passage 3a provided there in extending throughout along the center axis and a traverse groove 3c provided in the outer surface thereof extending in parallel to the pivot portions 3b or the pivot axis. The parallel pin 1a extending across the window 40 of the socket 4 is supported at both ends by the outer sleeve 1. As the outer sleeve 1 axially slides over the socket 4, the parallel pin 1a is also moved forward and backward axially in the window 40 of the socket 4. Simultaneously, the parallel pin 1a enters and engages with the traverse groove 3c of the ball valve 3 thus causing the ball valve 3 to pivotally rotate about the pivot portions 3b.

The operation of the embodiment is now explained assuming that the plug connect opening 1c side of the pipe coupling is designated as "frontward side" or outlet side and the side of the pipe joint member 2 as "backward side" or outlet side.

When the plug is removed out from the plug connect opening 1c of the socket 4, the outer sleeve 1 is moved to its backward limit position (the first position) together with the inner sleeve 9 as shown in FIG. 1. Also, the slide collar 7 is sprung back against the slide holder 8 by the collar spring 72 causing the locking balls 63 to radially outwardly move in their respective tapered bores 41. As a result, the locking balls 63 interrupt the forward movement of the inner sleeve 9 and the locking balls 62 in the inner sleeve 9 which are engaged with an annular groove 1b provided in the inner side of the outer sleeve 1 hence interrupt the forward movement of the outer sleeve 1 driven by the yielding force of a sleeve spring 71.

In other words, the outer sleeve 1 is pressed outwardly by the sleeve spring 71. The inner sleeve 9 is engaged by its locking balls 62 with the outer sleeve 1. The movement of the inner sleeve 9 is interrupted by the locking balls 63. This allows the outer sleeve 1 and the inner sleeve 9 to be driven to and remain at their back limit locations when the plug has been removed.

As the outer sleeve 1 moves backward, its parallel pin 1a comes to engagement with the traverse groove 3c hence rotating the ball valve 3 to the closed position as shown in FIG. 1. Assuming that the annular cross sectional of the slide packing 5 taken along the line B—B is S1 in area and the pressure of a fluid introduced from the pipe joint member 2 is maintained P, a load of P×S1 is applied to the slide packing 5 which is thus pressed against the surface of the ball valve 3 ensuring higher air-tight seal in the closed condition.

Figure 2:
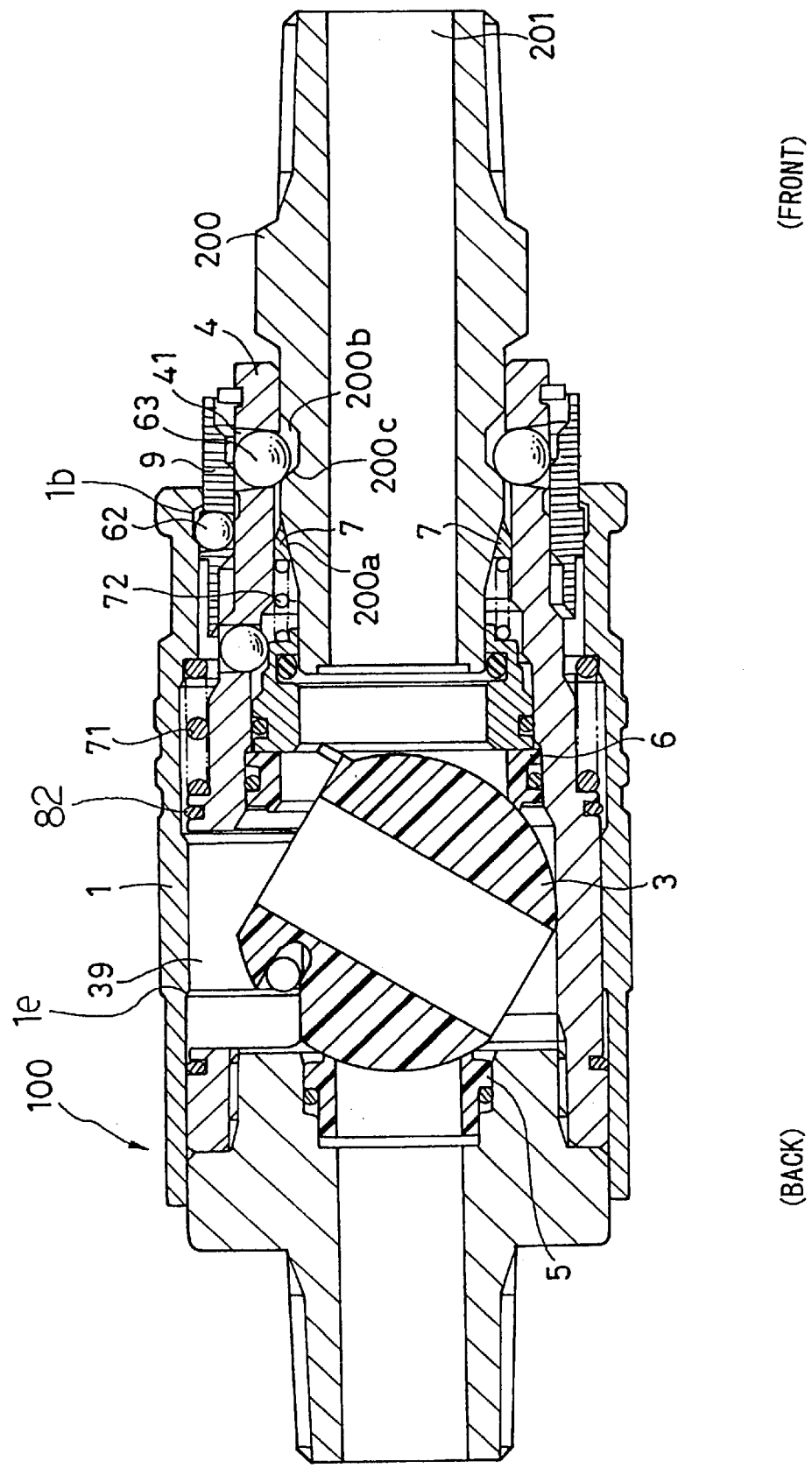
FIG. 2 is a cross sectional view with the plug being inserted, but the ball valve being still in closed position.

When the plug 200 is inserted into the plug connect opening 1*c* of the socket 4 of the pipe coupling 100 being closed, its tapered outer surface 200*a* drives the slide collar 7 backward as resisting against the yielding force of the collar spring 72, and the locking against the centerward (inner) movement of the locking balls 63 are released as shown in FIG. 2. Accordingly, the forward movement of the inner sleeve 9 which was prevented by the locking balls 63 is premitted, and then, the forward movement of the outer sleeve 1 prevented by the locking balls 62 are also premitted. As the result, the outer sleeve 1 is instantaneously advanced by the yielding force of the sleeve spring 71.

The centerward or radially inward movement of the locking balls 63 is interrupted by a tapered surface 200*c* of an outer groove 200*b* provided in the outer surface of the plug 200 hence allowing the locking balls 63 to project inwardly slightly from their respective tapered bores 41. The projected portions of the locking balls 63 come in engagement with a step on the inner surface of the inner sleeve 9 which is thus prevented from moving farther forwardly or toward the outlet end.

This causes the outer sleeve 1 to be prevented from further forward movement and it will temporarily stay at an intermediate position (the second position) as shown in FIG. 2.

When the plug 200 is further moved inward from the position shown in FIG. 2, its tapered surface 200*a* presses back the slide collar 7 as resisting against the yielding force of the collar spring 72. Then, the centerward movement of the locking balls 63 interrupted by the tapered surface 200*c* in the outer groove 200*b* of the plug 200 is unlocked and the locking balls 63 move into the outer groove 200*b*. Accordingly, the forward movement of the inner sleeve 9 interrupted by the locking balls 63 is now permitted, and then, the forward movement of the outer sleeve 1 interrupted by the locking balls 62 in the inner sleeve 9 is also permitted. As the result, the outer sleeve 1 is urged by the sleeve spring 71 and moved to the other limit position (the third position) at the plug 200 side as shown in FIG. 3.

As the parallel pin 1*a* engaged with the groove 3*c* of the ball valve 3 is instantaneously moved forward, the ball valve 3 rotates about the pivot axis 3× clockwise thus communicating the fluid passage 2*a* of the pipe joint member 2 with a fluid passage 201 of the plug 200 via the fluid passage 3*a* of the ball valve 3 as shown in FIG. 3. The ball valve 3 has a projection 3*d* thereof. When the ball valve 3 is rotated to the opened position, the projection 3*d* comes in direct contact with the inner surface of the plug side slide packing 6 hence preventing the ball valve 3 from over rotation.

In this embodiment, after the fluid passages 2*a* and 3*a* begin to communicate with each other, and before the ball valve is fully opened, fluid under pressure is introduced into the valve chamber 39, which is sealed with the seal rings 81 and 82, via the fluid passage 2*a* of the pipe joint member 2. The internal pressure of the chamber 39 is temporarily increased by the pressurized fluid introduced. An inner surface of the outer sleeve 1 exposed to the chamber 39 is acted on by the fluid pressure. The outer sleeve 1 has a side stepped portion or shoulder 1*e* at the inlet end of a small diameter portion 1*d* which has an inner surface exposed to the chamber 39. The outer sleeve 1 thus has a forward force applied thereto which is a function of an axial component of the pressure applied on the area of the end surface of the side stepped portion or shoulder 1*e* and the outer sleeve 1 moves toward the outlet end or forwardly when the chamber 39 is under pressure or toward the outlet end. As the outer sleeve 1 is moved forward completely, the ball valve 3 duly rotates to the opened position. The pressurized fluid in the valve chamber 39 is then discharged gradually from slits (not shown) provided in the seal rings 81 and 82 until the pressure in the valve chamber 39 is equal to the atmospheric pressure.

Inside the socket 4, the pressurized fluid urges the slide packings 5 and 6 against the ball valve 3 thus providing air-tight seal between the fluid passage 3*a* of the ball valve 3 and the interior side of the slide packings 5 and 6. The air-tight seal between the valve chamber 39 where the ball valve 3 is accommodated and the interior side of the slide packings 5 and 6 is maintained by the O-rings 51 and 52.

The O-ring 53 seals off between the outer surface of the slide holder 8 and the inner surface of the plug connect opening 1*c* of the socket 4. An O-ring 54 seals off between the inner surface of the slide holder 8 and the fluid passage 201 of the plug 200. Accordingly, the air-tight seals between the fluid passage 2*a* of the pipe joint member 2, the fluid passage 3*a* of the ball valve 3, and the fluid passage 201 of the plug 200 are ensured.

The pressurized fluid presses forward the slide holder 8 as resisting against the yielding force of the collar spring 72 between the plug 200 and the socket 4 thus moving the locking balls 61 outward radially.

For disconnection of the plug 200, the outer sleeve 1 is moved backward as resisting against the yielding force of the sleeve spring 71 as shown in FIG. 5. As the outer sleeve 1 is moved backward, its parallel pin 1*a* moves back and rotates the ball valve 3 about the pivot axis 3× in the opposite direction to the opening action, that is counterclockwise in FIGS. 5 and 6. When, the fluid passage 3*a* of the ball valve 3 departs from the fluid passage 2*a* of the pipe joint member 2, the pressurized fluid in the passages begins to be purged out from a gap between the slide packing 5 and the ball valve 3 to the valve chamber 39. As the inner pressure in the passages urging the slide packings 5 and 6 against the ball valve 3 is lowered, i.e. the sealing ability drops down, the ball valve 3 can be easily rotated to the closed position and the outer sleeve 1 can smoothly and easily be moved backward.

Figure 6:
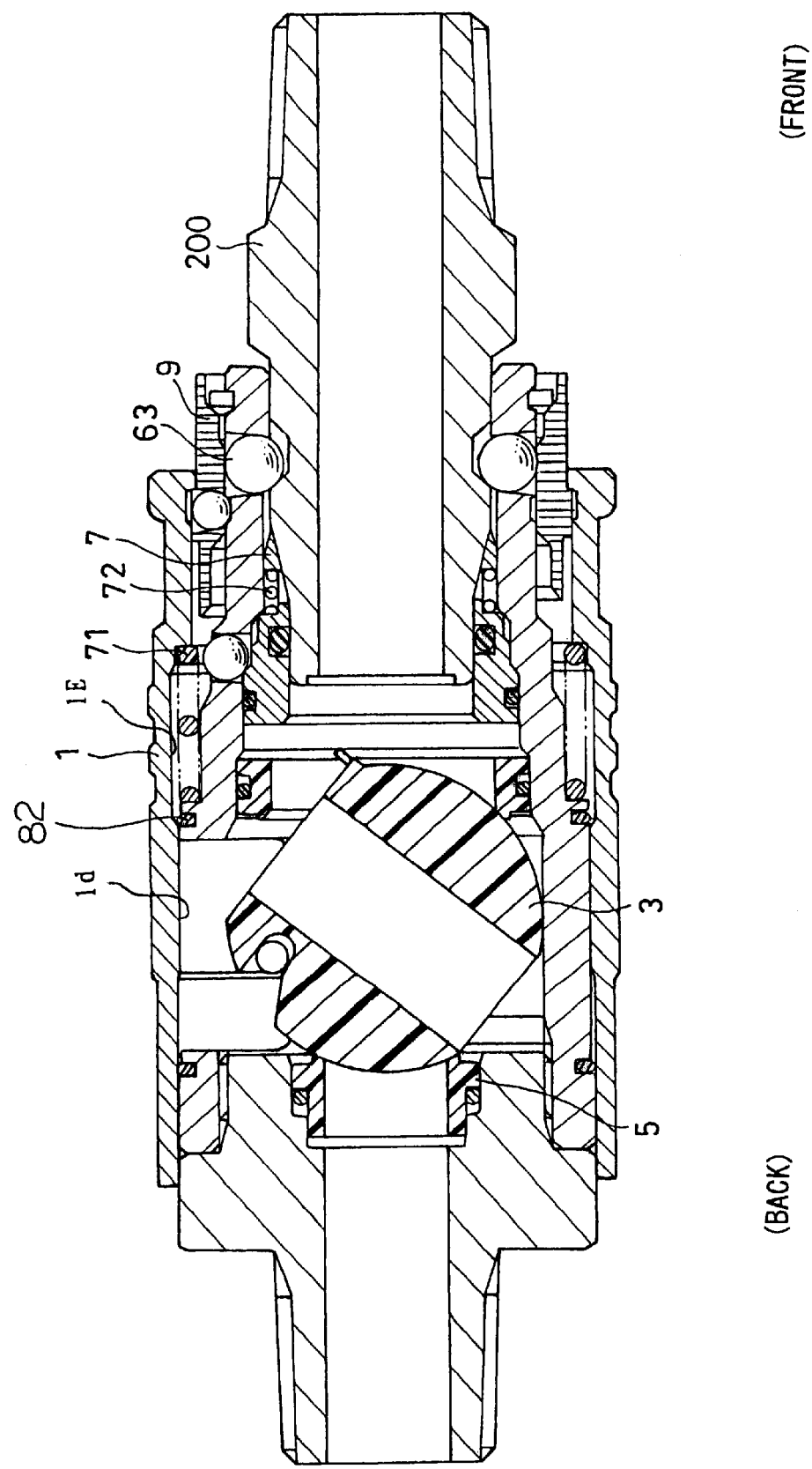
FIG. 6 is a cross sectional view of a second step of the disconnection of the plug from the pipe coupling.

When the outer sleeve 1 is further moved backward, the ball valve 3 is further rotated and shut off with its spherical surface the opening in the slide packing 5 as shown in FIG. 6. Then, the pressurized fluid in the plug 200 and the valve chamber 39 is purged from the clearance between the inner surface of the large-diameter portion 1E of the outer sleeve 1 and a seal ring 82 which now faces to the large-diameter portion 1E hence decreasing the inner pressure gradually.

Figure 7:
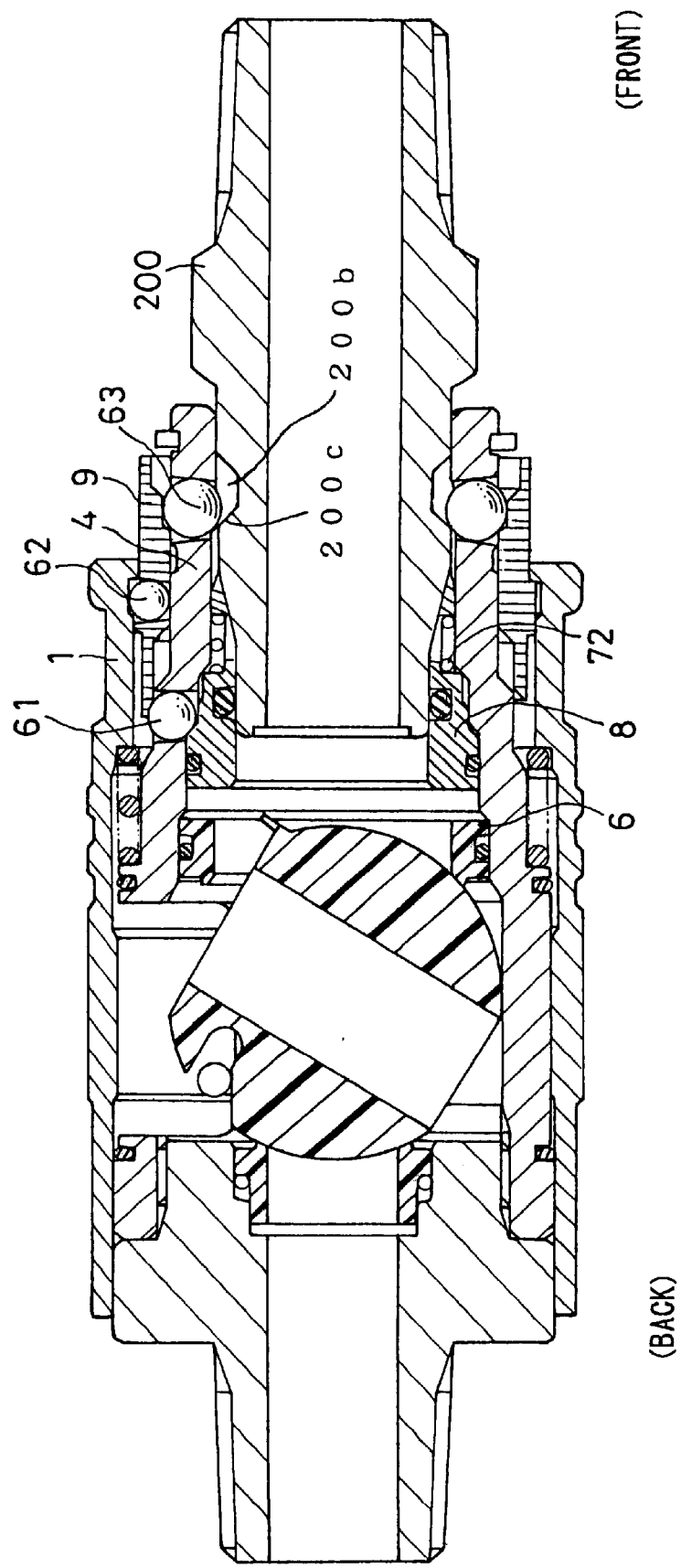
FIG. 7 is a cross sectional view of a third step of the disconnection of the plug from the pipe coupling.

As the outer sleeve 1 is further moved backward, the inner sleeve 9 comes to engagement with the outer sleeve 1 with locking balls 62 and moves backward together with the outer sleeve 1 as shown in FIG. 7. Before the inner pressure drops to a specific level, the slide holder 8 remains urged forward and holds the locking balls 61 in the socket 4 outwardly. As the locking balls 61 interrupts the further backward movement of the inner sleeve 9, the outer sleeve 1 is prevented from further backward moving, too. When the inner sleeve 9 is interrupted from moving backward, it permits no radial movement of the locking balls 63. This causes the locking balls 63 to partially project inwardly from the inner surface of the socket 4 and come in engagement with the tapered surface 200*c* in the outer recess 200*b* of the plug 200, hence preventing the plug 200 from removal.

In this embodiment, while the passage 201 of the plug 200 is under pressure, the locking balls 61 and 63 of the socket 4 stay in engagement with the inner sleeve 9 to prevent the plug 200 from being removed from the coupling 100. Even if the disconnecting operation is accidentally carried out by a careless operator before the inner pressure drops to the specific level, no removal of the plug 200 is ensured.

When the purging continues and the inner pressure drops down, the slide holder 8 is urged back by the collar spring 72 towards the slide packing 6 as shown in FIG. 8. This causes the locking balls 61 to unlock the movement of the inner sleeve 9 and the outer sleeve 1 is then moved towards the pipe joint member side together with the inner sleeve 9. Accordingly, the inner sleeve 9 unlocks the radial outward movement of the locking balls 63 hence allowing the removal of the plug 200.

As understood from the above description, the present invention provides the following advantages.

(1) No action is allowed for removing the plug before the inner pressure of the plug has been decreased to a specific level by purging the pressurized fluid in the passage of the plug after the ball valve is rotated to the closed position. Even when the closing action of the valve has been completed, any action for removing the plug is inhibited before the pressurized fluid in the plug is sufficiently purged out.

(2) The ball valve is pivotaly mounted for rotating movement, thus allowing no dislocation from the correct rotating direction nor parallel movement. Hence, the ball valve can be maintained in its designated position during the opening and closing operation.

(3) The ball valve is sealed off with the slide packings which is axially moved by the inner pressure. The higher the inner pressure, the more the sealing effect is guaranteed. When the inner pressure is lowered by purging the fluid in the passages, the sealing effect decreases thus allowing the ball valve to rotate with much ease.

(4) The ball valve has the projection provided on the surface thereof for preventing over rotating and hence is stopped at the correct position.

(5) The inner surface of the outer sleeve is arranged to be urged by the inner pressure for assisting the valve opening movement, thus allowing the ball valve to rotate to the opened position with much accuracy.

What is claimed is:

1. A valved coupler for fluid carrying lines comprising:

a tubular socket body having a passage with inlet and outlet ends;

a ball valve rotatable in the tubular socket body passage and movable from an open to a closed position, said inlet end being sealed when said ball valve is in the closed position;

a plug having an internal passageway and a peripheral locking groove formed on a tip end portion mounted in the outlet of the tubular socket body, a slide collar provided in the passage of said tubular socket body;

a first spring in the tubular socket body engaging the slide collar and biasing the slide collar toward the outlet end, the slide collar being moved away from the outlet end to compress the first spring when the plug is received in the outlet end;

a locking ball mounted for radial movement at the outlet end of said tubular socket body and moved outwardly when said slide collar is moved toward the outlet end and allowed to be moved inwardly to an inward position when said slide collar is moved in direction away from the outlet end by the plug;

an outer sleeve slidably supported on an exterior of said tubular socket body;

rotating means provided on the outer sleeve and engaging said ball valve to rotate the ball valve from the open position to the closed position as said outer sleeve is moved from a first position in a direction toward the inlet end to a second position;

a second spring for urging said outer sleeve toward the outlet end to its first position and causing rotation of said ball valve in a direction to move to the open position;

a slide holder slidably mounted in said tubular socket body on an outlet side of the ball valve and between the ball valve and the slide collar, the first spring engaging the slide holder, the slide holder being configured so an internal pressure in the plug greater than a predetermined level moves the slide holder toward the outlet end and the plug, said first spring urging the slide holder away from the outlet end and plug when the internal pressure of the plug is lower than the predetermined level;

an unlock ball radially movably in said tubular socket body and held outwardly while said slide holder is moved toward the outlet end and being free to move inwardly when said slide holder is moved away from the outlet end; and an inner sleeve slidably mounted on the outlet end of the tubular socket body and having a position slidably inside the outer sleeve, the inner sleeve being prevented from moving toward the outlet end from a first position by the locking ball when the locking ball is moved outwardly, and being prevented from moving toward the inlet end from a second position holding the locking ball in its inward position by the unlock ball when the unlock ball is held outwardly, the locking ball being held in the peripheral locking groove of said plug in its inward position, the inner sleeve in its first position releasing said locking ball to permit outward movement of the locking ball to clear the peripheral locking groove.

2. A valved coupler according to claim 1 further comprising a pair of annular seal members coaxially arranged on opposite sides of the ball valve and permitting flow through the ball valve when the ball valve is in the open position and sealing the inlet end and the outlet end of the tubular socket body passage respectively, and wherein each of said annular seal members is supported to be slidable in the tubular socket body passage along an axis and formed to be pressed against the ball valve by pressure in the socket body passage.

3. A valved coupler according to claim 1 wherein said ball valve is rotatable to its open and closed position on a fixed axis normal to the passage of the tubular socket body.

4. A valved coupler according to claim 1 wherein the ball valve has a projection on a surface thereof for stopping the ball valve from rotating beyond its open position by engaging the projection with a peripheral member on the tubular socket body.

5. A valved coupler according to claim 1 wherein a small diameter portion is formed on an inner surface of said outer sleeve and forms a shoulder on an inlet end of the small diameter portion, a pressure inside said outer sleeve acting on the shoulder to tend to move said outer sleeve toward the outlet end.

* * * * *

UNITED STATES PATENT AND TRADEMARK OFFICE
CERTIFICATE OF CORRECTION

PATENT NO. : 6,089,539
DATED : July 18, 2000
INVENTOR(S) : Toru Kouda

It is certified that error appears in the above-identified patent and that said Letters Patent is hereby corrected as shown below:

Column 3, line 48, after "1 to", insert --air tightly--.

Column 3, lines 56-57, delete "opening or outlet", and insert --or outlet opening--.

Column 3, line 60, delete "bores", and insert --bore--.

Column 3, line 63, delete "bores", and insert --bore--.

Column 4, line 45, delete "outlet", and insert --inlet--.

Column 5, line 17, delete "premitted", and insert --permitted--.

Column 5, line 18, delete "premitted", and insert --permitted--.

Signed and Sealed this

Seventeenth Day of April, 2001

Attest:

NICHOLAS P. GODICI

*Attesting Officer*   *Acting Director of the United States Patent and Trademark Office*